United States Patent [19]

Schoepe

[11] 4,100,928
[45] Jul. 18, 1978

[54] BALL COCK CONSTRUCTION FOR CONTROLLING THE LEVEL OF LIQUIDS SUCH AS WATER IN TANKS

[76] Inventor: Adolf Schoepe, 1620 N. Raymond Ave., Fullerton, Calif. 92631

[21] Appl. No.: 706,479

[22] Filed: Jul. 19, 1976

[51] Int. Cl.² .................... F16L 55/00; F16K 31/34
[52] U.S. Cl. .................................. 137/15; 137/315;
137/414; 137/430; 137/437; 137/442; 285/303;
285/322
[58] Field of Search .............. 137/218, 15, 414, 426,
137/429, 434, 432, 436, 437, 442, 444, 451, 315,
430; 285/390, 303, 322; 251/45

[56] References Cited

U.S. PATENT DOCUMENTS

| 447,078   | 2/1891  | Morgan        | 285/390 |
| 1,209,008 | 12/1916 | Messina       | 285/303 |
| 1,542,553 | 6/1925  | Hornbeck      | 285/303 |
| 2,098,581 | 11/1937 | Jones         | 285/322 |
| 2,383,692 | 8/1945  | Smith         | 285/322 |
| 2,827,073 | 3/1958  | Owens         | 137/426 |
| 2,986,155 | 5/1961  | Doyle         | 137/442 |
| 3,120,855 | 2/1964  | Fischer       | 137/451 |
| 3,195,565 | 7/1965  | Mackie        | 251/45  |
| 3,495,803 | 2/1970  | Schoepe et al.| 137/414 |
| 3,669,138 | 6/1972  | Schoepe et al.| 137/429 |
| 3,693,649 | 9/1972  | Gordon et al. | 137/414 |
| 3,797,518 | 3/1974  | Holm et al.   | 137/434 |
| 3,904,168 | 9/1975  | Marocco       | 251/45  |

FOREIGN PATENT DOCUMENTS

330,123   6/1930   United Kingdom ............... 285/390

Primary Examiner—Martin P. Schwadron
Assistant Examiner—G. L. Walton
Attorney, Agent, or Firm—Mahoney, Schick & Cislo

[57] ABSTRACT

Telescoped inlet and outlet tubes having a valve between upper extremities thereof are each formed with end telescoped, upper and lower parts, the tube upper parts being assembled movable together and the tube lower parts being assembled movable together for simultaneously increasing and decreasing the respective tube end telescoping to selectively change the overall height of the ball cock. Positive securement in a height adjusted position against straight vertical relative movement is obtained by positive radial interengagement between the outlet tube parts with either selective relative rotation or selective release of the interengagement with re-engagement providing the height adjustment. An upper main case covers the valve assembly and an inner end of a float connected valve actuating lever projects into the upper main case to a case slot, being pivoted therein and operably connected to the valve. A retainer surrounds the valve assembly secured to the outlet tube upper extremity with air vent for an antisyphon member beneath the valve assembly being formed through the retainer into the upper main case and to the surrounding air through the case lever slot. The retainer also bayonet joint removably mounts the valve cover over the valve seat member and the valve seat member over and removably retaining the antisyphon member and a lower water outlet directing insert.

17 Claims, 10 Drawing Figures

BALL COCK CONSTRUCTION FOR CONTROLLING THE LEVEL OF LIQUIDS SUCH AS WATER IN TANKS

BACKGROUND OF THE INVENTION

This invention relates to a ball cock construction of the type for controlling the level of liquids such as water in tanks. It incorporates in the structure thereof a multiplicity of unique inventive structural concepts. Each of the inventive structural concepts is, in and of itself, separately novel and adds in a separate degree to the overall improved ball cock function. More particularly, the ball cock construction of the present invention may include a uniquely arranged height adjustment feature, a unique maximum compactness feature, unique improved anti-syphon protection and a unique improved maintenance disassembly feature all collectively and each separately contributing to the overall improved results.

Various prior forms of float controlled ball cocks have heretofore been provided for the primary purpose of automatically controlling the flow into and the level of liquids within various types of storage tanks. Probably the major use of such ball cocks is in toilet water storage tanks wherein the supply water is received through the bottom wall of the tank by the ball cock, passing upwardly through a ball cock inlet tube to the upper extremity thereof, through a float controlled valve, down a ball cock outlet tube and ultimately into the inner confines of the tank. A float properly connected to the ball cock valve, raised and lowered by the tank water level, controls the opening and closing of the ball cock valve to thereby determine and maintain the desired water level within the tank. A separate and selectively operable outlet valve of the tank is operated to exhaust the water from the tank and through the toilet for flushing with the ball cock automatically admitting a further supply of water into the tank for refilling and maintaining the level of water therein ready for the next selective flushing action.

One of the major difficulties with the existing prior ball cock constructions prior to that of the present invention has been that these prior ball cock constructions have been formed of an average or standard predetermined height so as to be functional only in storage tanks of relatively standardized configuration. Certain of these prior ball cocks have included provisions for float adjustment in order to provide water level control adjustment within preset, rather narrow limits, that is, with the floats directly connected to and controlling the ball cock valves, linkage adjustments have been provided between the floats and valves so that the ultimate controlled closing of the valves can be slightly varied to thereby slightly vary the level of water maintained within the tanks.

Time has proven, however, that this slight water level control variance by the prior ball cocks has not been sufficient to adapt a standard ball cock height to the increasingly wide variety of tank configurations within which such ball cocks are required to be used. This has resulted in the necessity of manufacturing a series of models of ball cocks, each model having a different vertical height so as to be adaptable to a particular tank contour. With even increasing variance requirements of modern tank designs and particularly in the home plumbing field, such being coupled with fast rising manufacturing and material costs, the problems involved with multiple ball cock models adaptable to varying vertical heights has become quite prohibitive and has created an unwanted necessity of greatly limiting possible variations in tank design.

There has been one known prior ball cock construction which has been formed to permit selective vertical adjustment thereof, that is, selective vertical adjustment of the overall height thereof in order to adapt the same for widely varying water level requirements occasioned by differences in storage tank configuration. In this case, the ball cock construction has consisted of spaced, side by side inlet and outlet tubes, each formed with end telescoped, upper and lower tube parts vertically slidably sealed by resilient O-rings between the tube parts. Keeping in mind that with the usual water supply entrance into the storage tank being at the bottom wall thereof so that with this form of ball cock the major portion of the ball cock must be totally supported by the inlet tube thereof, the major problem with this construction of vertically adjustable ball cock has been the ease with which the adjusted height can be accidentally changed. With frictional forces being virtually the sole deterent to ball cock vertical height changing movement, slight vertical forces and even internal water pressure supplied against the upper portion of the ball cock can easily change the vertical height thereof to a lesser or greater level and thereby change the maintainment of water level in the tank to an unworkable level.

A further factor of consideration in the construction of ball cocks and again entering into the factor of storage tank configuration is the required space occupying size thereof while still efficiently serving its intended function. Particularly in the home plumbing field, space is an important factor and with water storage tanks necessarily being relatively large in order to retain a sufficient quantity of water therein for the required purposes, the compactness of the particular water level controlling ball cock which must occupy a portion of the internal tank space is a reasonably important factor. Thus, the maximum compactness with the retention of operating efficiency of the ball cock is a definite goal.

Still another factor of major consideration in the construction of ball cocks is the anti-syphon feature thereof which is of major importance from the safety standpoint. It is well known that virtually all building codes require that ball cocks be functional to prevent the syphoning of water from the particular storage tank reversely through the water supply pipes in the event of an excessive water pressure drop in the water supply pipes. In this manner, possibly contaminated water is prevented from returning to the water supply pipes which could cause the contamination within such pipes and the ultimate supplying of contaminated water to other locations, such as drinking water, where adverse consequences could ensue.

The anti-syphon devices in ball cocks are located directly at the ball cock valve and must necessarily be directly involved in the ball cock water flow paths or channels. They are arranged such that upon a vacuum or a reverse flow condition being developed in the water inlet tubes caused by the severe decrease in water pressure, this reverse flow force is automatically vented to the air above the tank water level preventing the reverse flow of any of the water from within the tank. For the safety purposes discussed, it is important that the venting air be drawn from the tank well above the water level thereof and the greater height that can be attained for such air venting, the greater the safety factor. Still in addition, in view of the fact that the anti-syphon device is directly within the ball cock water flow path and unwanted water escape through the anti-syphon air vent above the tank water level is to be prevented due to the unwanted noise that can be created thereby, circuitous air vent channels which, at the same time, are always positively open, are of a desirable nature.

A still further consideration in ball cock constructions is involved with the normal positive functioning thereof and is related to the fact that water flowing from usual water supplies, even though uncontaminated and perfectly safe for human use, contains a certain amount of relatively minute debris. For this reason, water flowing through ball cocks can deposit such debris within the required working parts thereof which can build up over a period of time and ultimately cause the particular ball cock to cease functioning as required. The only possible ultimate answer is, of course, to disassemble the ball cock and remove the debris collected. However, most of the prior ball cocks have either been constructed for permanent assembly where disassembly is impossible or constructed of such a complex assembly form such that disassembly and reassembly is virtually impossible except by skilled personnel. Replacement or the hiring of such skilled personnel is, therefore, a necessary requirement with the consequent expense involved.

OBJECTS AND SUMMARY OF THE INVENTION

It is, therefore, an object of this invention to provide a ball cock construction for controlling the level of liquids such as water in tanks which is not only of the more compact form wherein the inlet and outlet tubes thereof are telescoped rather than side by side, but which is at the same time selectively vertically adjustable over a relatively wide range of vertical heights and is retained in any selected adjusted position with positive securement which positively resists straight vertical forces which could accidentally change the selected vertical extension. According to the optimum form of the present invention, the telescoped inlet and outlet tubes of the ball cock are, in turn, each formed of end telescoped upper and lower parts. Furthermore, at least certain of the inlet and outlet tube upper and lower parts, preferably the outwardly positioned outlet tube upper and lower parts, are formed with selectively adjustable, radially interengaged means there between which normally resist at least straight vertical forces so as to normally maintain the relative vertical positioning there between. At the same time, through selected preplanned manipulation, the telescoping of the inlet and outlet tube parts may be changed to increase or decrease the overall height of the ball cock thereby adapting the same to virtually all tank configurations and water level heights within reasonable limitations while still only making use of a single ball cock model.

In one preferred form of the ball cock construction of the present invention, the height controlling tube upper and lower parts are formed one with a continuous spiral groove and the other with a radial projection interengaged in such spiral groove so that by relative rotation between the tube upper and lower parts, the overall height of the ball cock is increased or decreased depending on the direction of rotation. In another preferred form of the ball cock of the present invention, a series of vertically spaced recesses, preferably a series of vertically spaced annular grooves, are formed on one of the height controlling tube upper and lower parts and a radial projection is formed on the other of the parts with release means normally retaining the radial projection interengaged in one of the recesses or annular grooves to normally maintain the preset overall vertical height of the ball cock, but with the release means permitting disengagement of such interengagement for the selective changing of the ball cock overall vertical height and the re-engagement of the radial projection into a different of the recesses or annular grooves. Thus, in either preferred form, the ball cock is positively retained at any of its determined overall vertical heights and against at least straight vertical forces which could accidentally change such height such as an accidentally applied downward vertical force or an upward vertical force caused by the inflow water pressure of the inlet tube.

It is a further object of this invention to provide a ball cock construction for controlling the level of liquids such as water in tanks which is constructed of maximum compactness with a minimum of exposed movable parts and is operable in a highly efficient manner for serving its intended water or other liquid level controlling purposes. In the optimum form, the ball cock vertical outlet tube compactly telescopes the inlet tube thereof with the water inlet controlling valve positioned therebetween at the upper extremities thereof and with the vertically movable float telescoping and vertically guided by the outlet tube. More important to the principles of the present invention, a main case encloses the valve and a valve operating lever or actuating lever extends through a slot of the main case having the inner end thereof operably connected to the valve and projecting outwardly of the main case for linkage connection to the float. As a result, the only exposed movable parts are a portion of the valve actuating lever, the movable float and the tying linkage therebetween with even these exposed movable part portions being of a minimum projection due to the compactness of the overall ball cock construction. With such minimum space compactness, therefore, the space requirements of the ball cock construction within a particular water or other liquid tank are of a highly desirable nature.

It is still a further object of this invention to provide a ball cock construction for controlling the level of liquids such as water in tanks wherein the anti-syphon structure thereof is uniquely formed with an improved air venting connection such that the important transmission of venting air from above the water or liquid level in the tank during the syphoning preventive operation is spaced well above such water or liquid level so that proper anti-syphon operation is always insured. In the preferred form, the ball cock valve is positioned at the upper end of the vertical inlet tube surrounded by a main case which is specifically provided with a void overlying the valve structure and within such main case. The anti-syphon structure directly underlies the valve and the anti-syphon functioning air vent thereof communicates around the valve and into the upper case void with an aperture or opening through an upper portion of the case completing the necessary communication with the air in the tank well above the tank water or liquid level. Where the valve actuating lever extends partially into the inner confines of the main case as hereinbefore described, the same opening or slot serving for the valve actuating lever may also serve as the air venting communication for the anti-syphon structure, again still well above the level of the water or other liquid in the tank. Furthermore, with the described anti-syphon air venting, it is impossible for water to escape from the anti-syphon structure during the normal functioning of the ball cock eliminating unwanted noise particularly important in home plumbing installations.

It is also an object of this invention to provide a ball cock construction for controlling the level of liquids such as water in tanks wherein the various liquid or water directing and flow controlling parts thereof are specifically constructed and assembled for maximum convenience of disassembly in carrying out required maintenance operations necessary for retaining the ball cock in efficient functioning condition. According to the principles of the present invention, all of the water directing elements of the ball cock including the internal elements of the valve, the anti-syphon structure and others, are conveniently retained in assembly by selectively releasable, bayonet joint arrangements, so that disassembly and reassembly of the ball cock may be accomplished in a minimum of time without special skill or tools. Thus, the water directing elements of the ball cock may be conveniently kept clear of debris collection which, if neglected, can cause ball cock malfunctioning. At the same time, those portions of the ball cock water directing elements which suffer functional degradement after normal periods of use may be easily and conveniently replaced so that the ball cock may always be maintained in optimum functional condition.

Other objects and advantages of the invention will be apparent from the following specification and the accompanying drawings which are for the purpose of illustration only.

BRIEF DESCRIPTION OF THE DRAWINGS

FIG. 4 is a view taken from the upper portion of FIG. 3, but showing the ball cock in a valve open condition directing water there through;

DESCRIPTION OF THE BEST EMBODIMENTS CONTEMPLATED

Referring to FIGS. 1 through 3 and 6 through 9, one preferred embodiment of the ball cock construction of the present invention is shown operably installed in a conventional toilet water flush tank generally indicated at 20 having a usual water supply pipe 22 directing a supply of pressurized water to a tank bottom wall 24 into the ball cock construction, all of which will be hereinafter described more in detail. Specifically to the ball cock construction at this time, however, the ball cock construction includes vertically extending, telescoped, inner water inlet and outer water outlet tubes respectively generally indicated at 26 and 28, a water flow controlling valve assembly generally indicated at 30 between the upper extremities of the inlet and outlet tubes 26 and 28, an anti-syphon assembly generally indicated at 32 downwardly adjacent the valve assembly 30, a retainer generally indicated at 34 radially outwardly surrounding the valve assembly 30 and the anti-syphon assembly 32, a main case assembly generally indicated at 36 radially outwardly enclosing the retainer 34 and upwardly enclosing the valve assembly 30, and a float generally indicated at 38 vertically movably telescoping the outlet tube 28 directly beneath the main case assembly 36. All of these various elements of the ball cock construction may be formed of well known materials and by usual manufacturing methods to provide the specific configurations and assemblies thereof to be hereinafter described.

Figure 1:
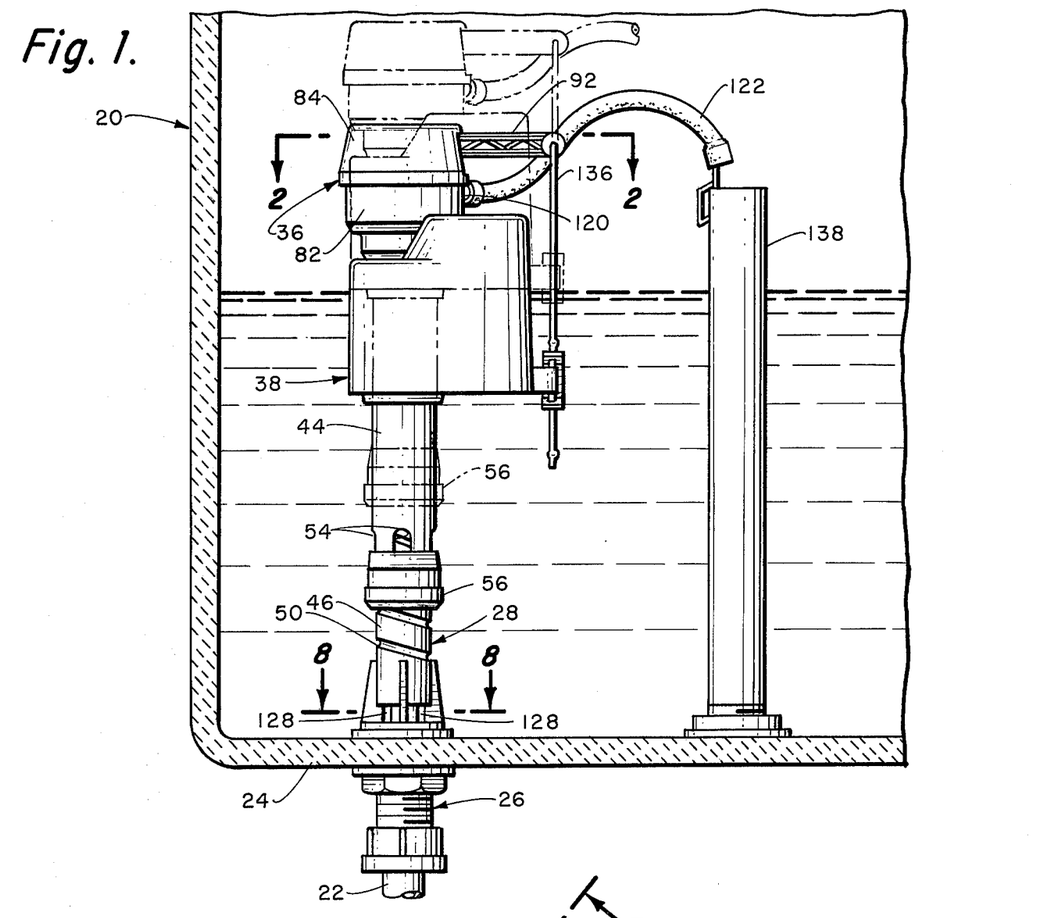
FIG. 1 is a fragmentary, side elevational view of one preferred embodiment of the ball cock construction of the present invention shown operably installed in a toilet water tank, the water tank being shown in vertical section.
Figure 3:
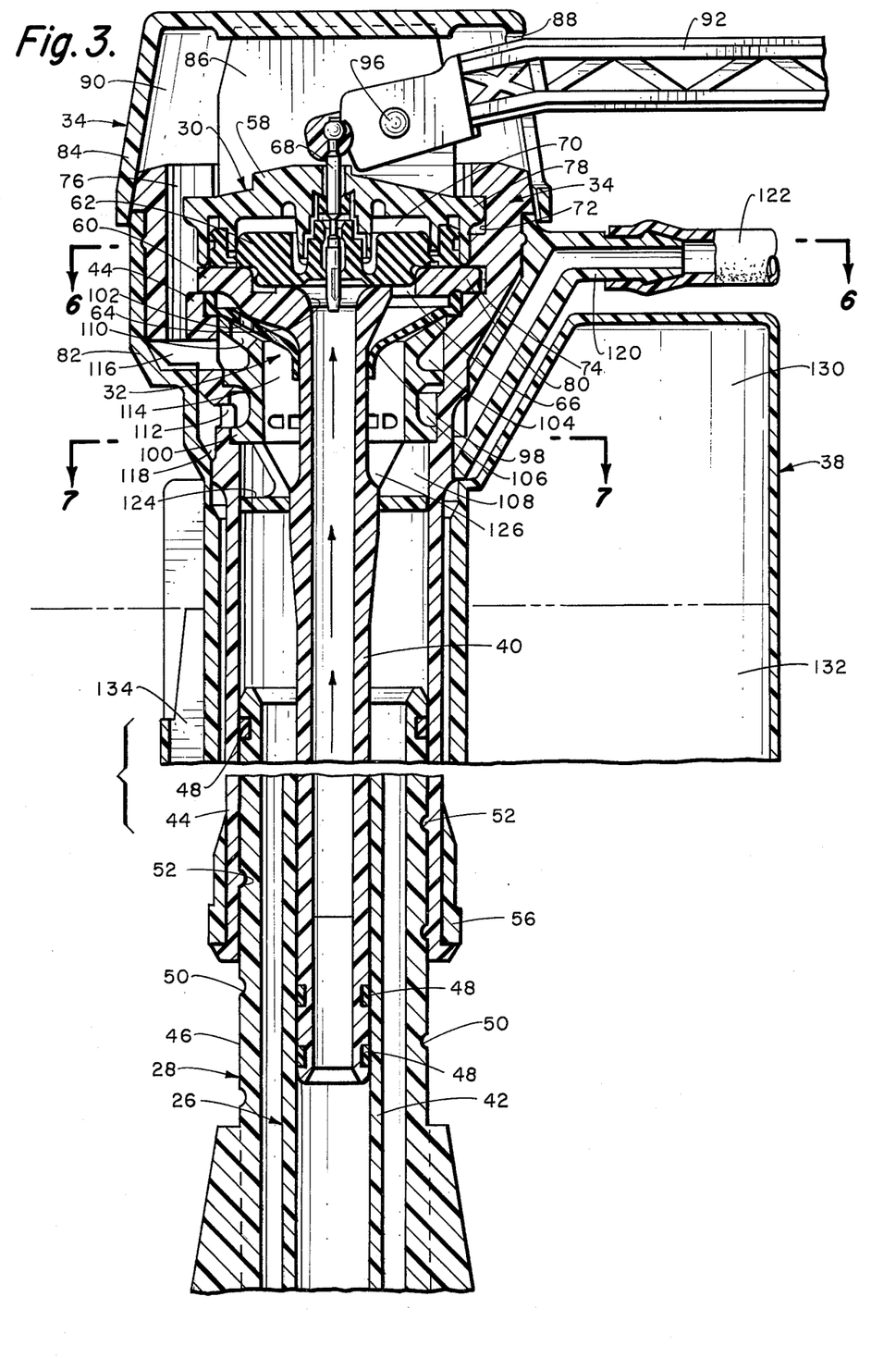
FIG. 3 is an enlarged, fragmentary, vertical sectional view looking in the direction of the arrows 3—3 in FIG. 2 and showing the ball cock in valve closed condition.

As best seen in FIG. 1 and 3, the water inlet tube 26 is formed of end telescoped, upper and lower parts 40 and 42, and the water outlet tube 28 is also formed of end telescoped, upper and lower parts 44 and 46. In the case of the water inlet tube 26, the lower part 42 telescopes over the upper part 40, while in the case of the water outlet tube 28, the opposite is true and the upper part 44 telescopes over the lower part 46. In both cases, appropriate resilient radial seals 48 are positioned between the upper and lower parts so that proper water communication is maintained despite the vertical positioning of these tube parts.

In the preferred form shown, the inlet tube upper and lower parts 40 and 42 are merely vertically slidably engaged, whereas normally radially interengaged adjustment means is provided between the outlet tube upper and lower parts 44 and 46 in the form of a continuous spiral groove 50 in the outer surface of the outlet tube lower part 46 normally radially interengaged by a matching spiral radial projection 52 on the inner surface of the outlet tube upper part 44. The spiral groove 50 on the outlet tube lower part 46 preferably extends the major portion of the vertical height of the outlet tube lower part but important to certain of the principles of the present invention, this spiral groove terminates spaced slightly downwardly from the lower part upper extremity. The spiral radial projection 52 on the outlet tube upper part, however, need only extend a relatively short distance, preferably approximately one and one quarter circumferences of the upper part inner surface.

A multiplicity, preferably four, equally circumferentially spaced and axially extending slots 54 are formed through the lower extremity of the outlet tube upper part 44 with the slots opening downwardly of the tube upper part and the spiral radial projection 52 thereof is directly radially inwardly of the slots. A vertically slidable lock collar 56 is assembled telescopically surrounding the outlet tube upper part 44 and is normally positioned surrounding this slotted lower extremity sized to retain the tube upper part radially inwardly against the outlet tube lower part 46 and the radial projection 52 radially interengaged within the spiral groove 50 of the respective tube parts. The inlet and outlet tube lower parts 42 and 46 are preferably molded from plastic as an integral unit so as to be movable together. The inlet and outlet tube upper parts 40 and 44 are likewise preferably molded from plastic and are secured movable together as a unit by assembly as will be later described.

Thus, with the lock collar 56 positioned at the lower extremity of the outlet tube upper part 44 as shown in FIGS. 1 and 3, retaining the radial projection 52 interengaged in the spiral groove 50, relative rotation between the outlet tube upper and lower parts 44 and 46 will cause telescoped extension and reduction of the inlet and outlet tubes 26 and 28, thereby selectively vertically adjusting the overall height of the ball cock construction. At the same time, due to the positive interengagement between the outlet tube spiral groove 50 and radial projection 52, straight downward vertical forces on the ball cock construction will not accidentally reduce the vertical height thereof nor straight upward vertical forces, such as water pressure within the inlet tube upper and lower parts 40 and 42, will not accidentally increase the height of the ball cock construction. Furthermore, since the spiral groove 50 on the outlet tube lower part 46 terminates its continuous spiral extension spaced slightly downwardly from the tube lower part upper extremity, as long as the lock collar 56 is at the lower extremity of the outlet tube upper part 44 (FIG. 3) retaining the radial projection 52 interengaged with the spiral groove 50, relative rotation will always be forced to stop short of completely vertically separating the inlet and outlet tube upper parts 40 and 44 from the lower parts 42 and 46. However, by sliding the lock collar 56 upwardly along the outlet tube upper part 44 upwardly away from the slots 54 thereof, these slots will permit outward flexing of the lower extremity of the outlet tube upper part to disengage the radial projection 52 from the spiral groove 50, in turn, permitting complete separation and/or reassembly of the various tube upper and lower parts.

Figure 4:
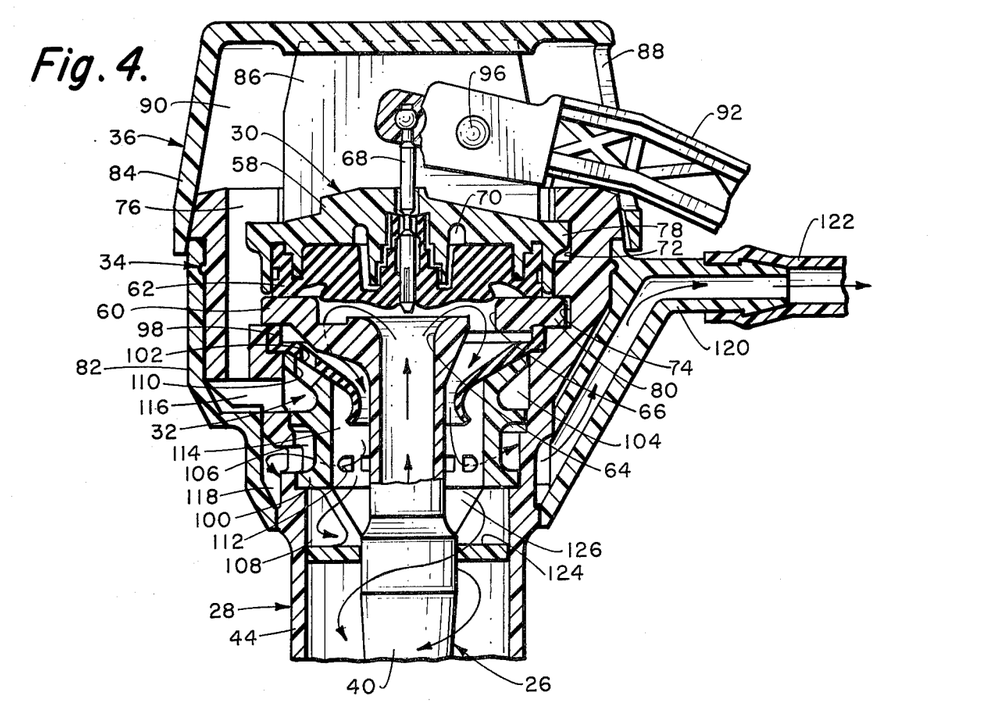

The valve assembly 30 is generally of known construction including a valve cover 58 assembly downwardly over a valve seat 60 with a resilient material valve seal 62 therebetween. The valve seat 60 is formed with a central valve inlet 64 in full communication with the upper part 40 of the water inlet tube 26 and a series of circumferentially spaced valve outlets 66 spaced radially outwardly of the valve inlet 64 and communicating fully downwardly with an upper extremity of the upper part 44 of the water outlet tube 28 as will be hereinafter described more in detail. A pilot valve pin 68 is mounted vertically movable centrally of the valve cover 58, the valve seat 60 and the valve seal 62 having a lower end projecting downwardly of the valve seal 62 and an upper end projecting upwardly of the valve cover 58. In a lower position as shown in FIG. 3, the pilot valve pin 68 admits a small portion of water from the water inlet tube 26 upwardly centrally of the valve seal 62 and into a pilot valve chamber 70 to force the valve seal 62 downwardly against the valve seat 60 sealing between the valve inlet and outlets 64 and 66 so as to prevent water from passing from the water inlet tube 26 to the water outlet tube 28 placing the valve assembly 30 in a closed position. When the pilot valve pin 68 is raised vertically as shown in FIG. 4, the pilot valve pin permits exhaustion of the water from the pilot valve chamber 70 which, in turn, permits the valve seal 62 to raise as forced by the water pressure from the water inlet tube 26, therefore establishing water communication and flow between the valve inlet and outlets 64 and 66 placing the valve assembly 30 in an open position.

More important to the principles of the present invention, the retainer 34 is generally hollow cylindrical and circumferentially surrounds the valve assembly 30 projecting downwardly spaced transversely of the water inlet tube 26 and preferably being integrally secured to the upper extremity of the water outlet tube 28. An annular first bayonet joint channel 72 is formed at the inner surface of the retainer 34 opening inwardly thereof and a similar annular second bayonet joint channel 74 is formed in the retainer axially spaced there beneath. A series, preferably four, of axial or vertical slots 76 are formed downwardly through the retainer 34 opening inwardly thereof and through the first and second bayonet joint channels 72 and 74, such slots penetrating the retainer axially downwardly beyond the second bayonet joint channel 74 for a purpose to be hereinafter described.

Preferably four, radially outwardly projecting and equally circumferentially spaced bayonet joint tabs 78 are formed from the periphery of the valve cover 58, and preferably four similarly projecting and similarly spaced bayonet joint tabs 80 are formed on the periphery of the valve seat 60. All of the bayonet joint tabs 78 and 80 of the valve cover and seat 58 and 60 are of a size to be received freely downwardly through the retainer slots 76 and circumferentially into the appropriate first and second bayonet joint channels 72 and 74. Furthermore, all of the bayonet joint tabs 78 and 80 are appropriately circumferentially tapered so as to be initially receivable circumferentially into the first and second bayonet joint channels 72 and 74 circumferentially adjacent to the retainer slots 76 and ultimately to axially vertically engage tightly with the retainer channel surfaces in usual bayonet joint fashion.

Figure 2:
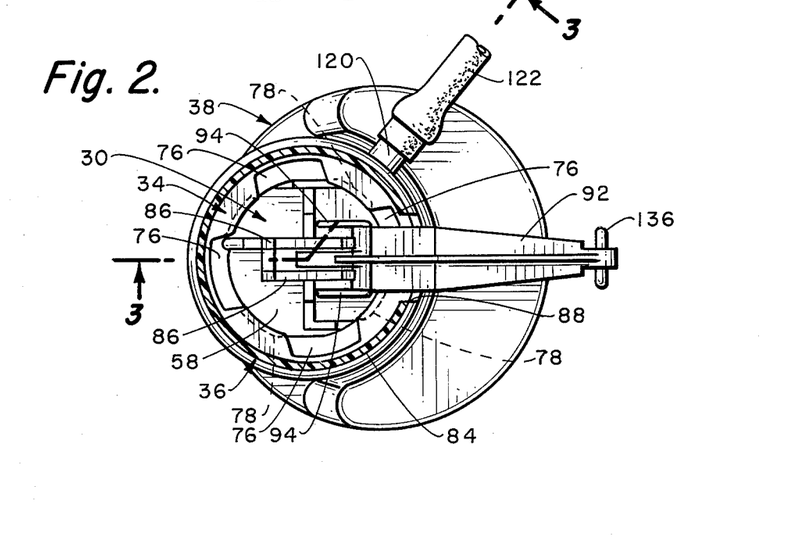
FIG. 2 is an enlarged, fragmentary, horizontal sectional view of the ball cock of FIG. 1 looking in the direction of the arrows 2—2 in FIG. 1.
Figure 6:
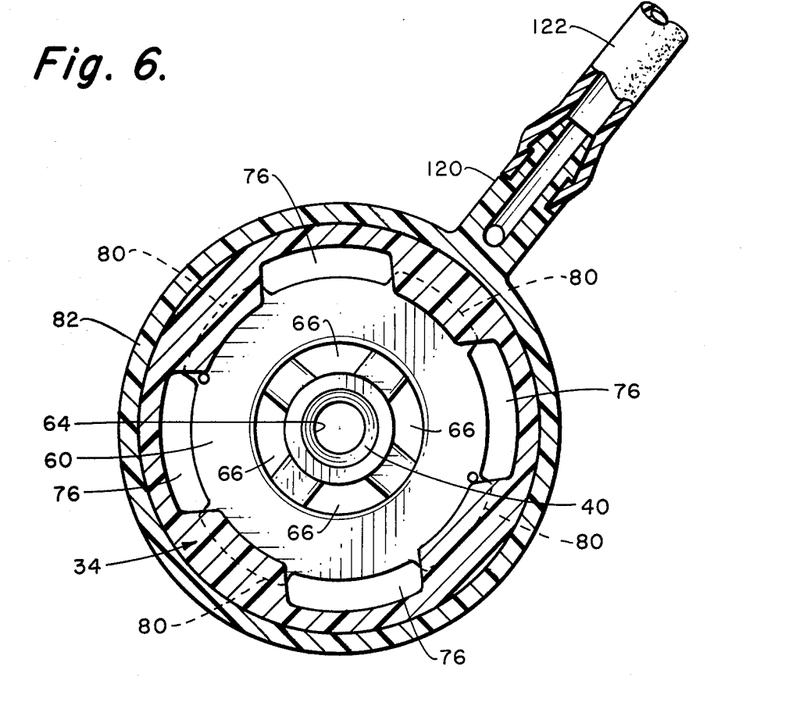
FIG. 6 is a horizontal sectional view looking in the direction of the arrows 6—6 in FIG. 3.

Thus, with the valve assembly 30 disassembled from the retainer 34, the valve seat 60 may be first passed downwardly to the retainer slot 78 to the second bayonet joint channel 74 and then rotated slightly circumferentially to engage firmly in bayonet joint fashion with the retainer 34 as best seen in FIGS. 3 and 6. Furthermore, with the upper extremity of the inlet tube upper part 40 being integrally secured to the valve seat 60 as can be seen in FIG. 3, this upper part of the water inlet tube 26 is secured into assembly simultaneously with the valve seat 60. Thereafter, the valve cover 58, valve seal 62 and pilot valve pin 68 are brought into assembly with the valve cover ultimately being positioned downwardly at the first bayonet joint channel 72 and slightly circumferentially rotated to bayonet joint assemble the remainder of the valve assembly 30 as best seen in FIGS. 2 and 3. A unique double bayonet joint arrangement is therefore provided for quickly and conveniently assembly and disassembling the valve assembly 30, preferably including the upper part 40 of the water inlet tube 26, for original assembly and later disassembly for certain maintenance operations as will be hereinafter discussed more in detail.

The main case assembly 36 includes a generally hollow cylindrical lower main case 82 which closely surrounds the major portion of the retainer 34 extending downwardly to the retainer lower extremity where it is sealed with the retainer by any usual means, for instance, by heat sealing or cement where both the retainer and lower main case are formed of plastic. The lower main case 82 terminates upwardly slightly spaced axially or downwardly from the upper extremity of the retainer 34. The main case assembly 36 also includes an inverted cup-shaped upper main case 84 which downwardly partially telescopes the upper extremity portion of the retainer 34 and slightly downwardly telescopes the upper extremity of the lower main case 82 in skirt-like fashion, all as well shown in FIG. 3.

The upper main case 84 extends well above the valve assembly 30 and is downwardly supported by a pair of transversely spaced, generally vertically extending mounting plates 86 which are preferably integrally formed with and projecting upwardly from the valve cover 58 of the valve assembly 30. The upper main case 84 further is formed with a combined vent opening and lever slot 88 transversely therethrough extending a substantial portion of the upper main case height. As is shown for instance in FIG. 3, therefore, the upper main case 84 forms a substantial void 90 overlying the valve assembly 30 which freely communicates downwardly with the slots 76 of the retainer 34 and freely communicates upwardly of the upper main case with the air surrounding the same through the vent opening or lever slot 88 for a purpose to be hereinafter described.

One end portion of a valve operating lever 92 extends inwardly through the lever slot 88 of the upper main case 84 and between the mounting plate 86 on the valve cover 58 with an inner extremity of this valve operating lever being pivotally secured to the upper extremity of the pilot valve pin 68 of the valve assembly 30. Spaced from its inner extremity, the valve operating lever 92 is pivotally connected to the valve cover mounting plates 86 by mounting arms 94 which extend transversely from the valve operating lever along the outer sides of the valve cover mounting plates with a horizontal pivot pin 96 projecting there between, pivotally through the valve cover mounting plates and through the valve operating lever. The valve operating lever 92 is thereby freely pivotal upwardly and downwardly for moving the pilot valve pin 68 of the valve assembly 30 upwardly and downwardly and opening and closing the valve assembly as hereinbefore described. The outer extremity of the valve operating lever 92 is pivotally connected to the float 38 for such valve operating lever movement in a manner to be hereinafter pointed out.

The anti-syphon assembly 32 includes a resilient material, generally conical anti-syphon member 98 directly vertically underlying the valve seat 60 of the valve assembly 30 and a water outlet directing insert 100 underlying the anti-syphon member still within the retainer 34 but having a lower extremity projecting slightly downwardly into the upper extremity of the outlet tube upper part 44, the relative positioning being as seen in FIG. 3. As shown in FIG. 3, the anti-syphon member 98 is outwardly peripherally compressed vertically or axially between the valve seat 60 and the retainer 34 during the previously described bayonet joint assembly of the valve seat with the retainer. Furthermore, the anti-syphon member angles inwardly, and normally telescopes and lies against the upper extremity of the inlet tube upper part 40. One or more air vent openings 102 are formed through the anti-syphon member 98 to provide air communication there through to the valve seat 60 during anti-syphon functioning as will be further discussed hereinafter.

Figure 7:
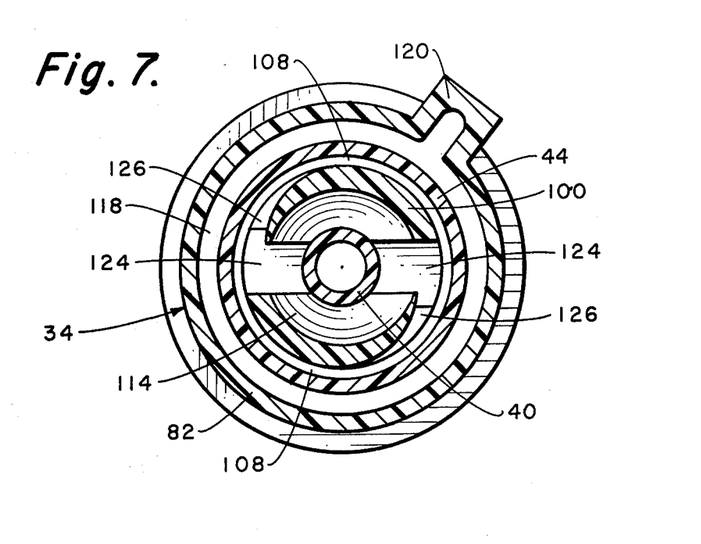
FIG. 7 is a horizontal sectional view looking in the direction of the arrows 7—7 in FIG. 3.
Figure 8:
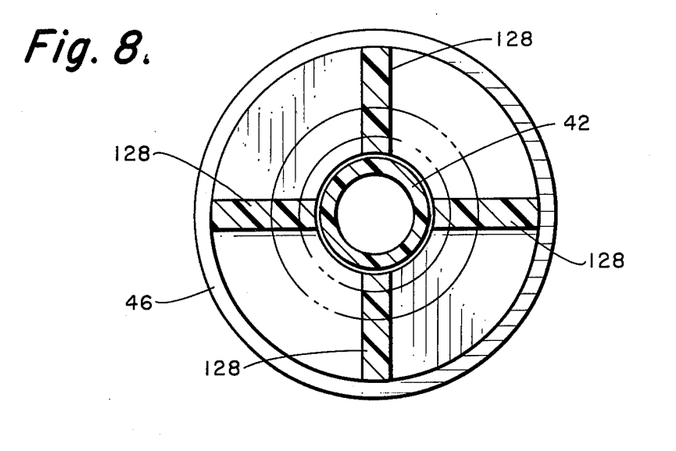
FIG. 8 is an enlarged, horizontal sectional view looking in the direction of the arrows 8—8 in FIG. 1.
Figure 9:
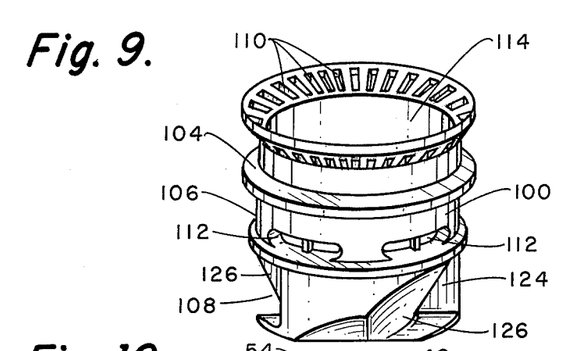
FIG. 9 is a perspective view of a water outlet directing insert removed from the ball cock of FIG. 1.

The water outlet directing insert 100 is formed of rigid material, preferably plastic, and is shown in FIGS. 3 and 7 in assembly and in FIG. 9 separate from such assembly. As shown, the outlet directing insert 100 forms an upper, annular air vent channel 104, a generally central, annular refill water channel 106, and a lower, circumferentially split, outlet water directing channel 108. The air vent channel 104 communicates outwardly through the retainer 34 with the retainer slots 76 and inwardly through a multiplicity of air vent openings 110 with the air vent opening or openings 102 of the anti-syphon member 98.

The refill water channel 106 communicates radially inwardly through a multiplicity of refill water openings 112 with an annular, outlet water flow channel 114 radially between the outlet directing insert 100 and the outer surface of the inlet tube upper part 40. As can be seen in FIG. 3, this refill water channel 106 communicates radially outwardly through a multiplicity of retainer slots 116 formed radially outwardly through the retainer 34 with an annular, retainer refill water channel 118 outwardly enclosed by the lower main case 82. Also as shown in FIG. 3, a refill tube 120 is formed preferably integrally in the lower main case 82 communicating downwardly with this retainer refill water channel 118 and upwardly and outwardly with a preferably resilient refill hose 122.

Basically completing the outlet directing insert 100, the outlet water directing channel 108 communicates angularly upwardly or axially through diametrically opposite, outlet water slots 124 with the outlet water flow channel 114, and downwardly and somewhat circumferentially along tapered surfaces 126 into the upper portion of the outlet tube upper part 44 outwardly of the inlet tube upper part 40. With this configuration of the outlet water directing channel 108, the main flow of outlet water received from the outlet water flow channel 114 is directed downwardly into the outlet tube upper part 44 in a spiral flow path so as to insure smooth outlet water flow downwardly through the water outlet tube 28 ultimately to the lower end thereof and minimize flow noise. The outlet water ultimately exits the water outlet tube 28 at the lower extremity of the outlet tube lower part 46 into the flush tank 20 through a series of slots 128, the latter being best seen in FIGS. 1 and 8.

Finally as to the main functional elements of the overall ball cock construction, the float 38 may be of any usual functional form and in this case as shown in FIGS. 1 and 3 vertically or axially telescopes the upper part 44 of the outlet tube 28 for vertical guided movement there along. The float 38 includes the usual combined air chamber 130 and water ballast chamber 132 simultaneously receiving water and air through the inlet opening 134. Furthermore, the float 38 is operably connected to the exterior extremity of the valve operating lever 92 by a somewhat usual connecting rod 136 operably connected there between in somewhat usual manner. As is the usual, the float air chamber 130 maintains the float 38 at and movable with the water level within the flush tank 20 and the water ballast chamber 132 maintains the float positively movable downwardly with a decrease in such water level, the float thereby positively moving the valve operating lever 92 pivotally upwardly and downwardly to control closing and opening of the valve assembly 30.

In operation of the ball cock construction of the present invention in this first embodiment form, the same is mounted in the flush tank 20 as shown in FIG. 1. In such installation, the ball cock construction is supported on the tank bottom wall 24 with the lower extremity of the inlet tube lower part 42 extending there through operably connected to the water supply pipe 22 and the lower extremity of the outlet tube lower part 26 transversely communicating into the flush tank proper through the slots 128. The simple installation is completed by merely clip connecting the exterior end of the refill hose 122 to the upper end of overflow pipe 138 in usual manner and for directing toilet refill water into the overflow pipe.

With the ball cock construction of the present invention, the proper relative overall vertical height thereof may be originally adjusted prior to installation or where internal tank space permits, may be adjusted after installation for the desired water level within the flush tank 20. Prior to installation, this is accomplished merely by relative rotation between the outlet tube upper and lower parts 44 and 46, relative rotation in one direction increasing the height and relative rotation in the other direction decreasing the height. After installation, and with the exterior end of the refill hose 122 disconnected from the overflow pipe 138, the outlet tube upper part 44 would be rotated relative to the outlet tube lower part 46. Minor adjustments of water level may be accomplished in the usual manner by selective adjustment of the float 38 along the connecting rod 136.

Starting with the water level within the flush tank 20 at the desired maximum as shown in FIGS. 1 and 3, the float 38 will maintain the exterior end of the valve operating lever 92 pivotally upwardly positioning the interior end thereof downwardly to maintain the pilot valve pin 68 of the valve assembly 30 downwardly. This admits water under pressure from the water inlet tube 26 upwardly into the pilot valve chamber 70 forcing the valve seal 62 downwardly against the valve seat 60 between the valve inlet and outlet 64 and 66. This, therefore, seals off the water supply flow from the inlet tube 26 at the valve seat 62 of the valve assembly 30 preventing the flow of water into the flush tank 20.

When the connected toilet (not shown) is flushed in the usual manner, the major portion of the water within the flush tank 20 is exhausted dropping the water level and thereby moving the float 38 downwardly. Downward movement of the float 38 pivots the exterior end of the valve operating lever 92 downwardly raising the interior end thereof to raise the pilot valve pin 68 upwardly as shown in FIG. 4. With the pilot valve pin 68 in its upper position as shown, the pressurized supply or water in the water inlet tube 26 forces the valve seal 62 upwardly against the valve cover 58 closing the pilot valve chamber 70 with the small quantity of water previously in the pilot valve chamber exhausting upwardly around the pilot valve pin through the valve cover.

This upward movement of the valve seal 62 permits communication between the valve inlet and outlets 64 and 66 of the valve seat 60 so that the pressurized supply of water flows downwardly from the valve seat outlets 66 forcing the inner extremity of the anti-syphon member 98 outwardly away from the outer surface of the inlet tube upper part 40 flowing the water into the outlet water flow channel 114 of the outlet directing insert 100. With the valve assembly 30 in this open position, the water continues to flow through the outlet water flow channel 114 of the outlet directing insert 100 and a portion thereof flows outwardly through the refill water openings 112 into the refill water channel 106 and ultimately through the refill tube 120, the refill hose 122 and into the overflow pipe 138 for the usual toilet refilling function. The major portion of the water flowing through the outlet water flow channel 114 of the outlet directing insert 100, however, flows on downwardly through the outlet water slot 124 into the outlet water directing channel 108 and ultimately in a swirl path as before described, downwardly through the water outlet tube 28 around the water inlet tube 26 and into the interior of the flush tank 20 through the slots 128 in the lower end of the outlet tube lower part 46. It will be noted that even if a small portion of the water flowing by the anti-syphon member 98 passes through the air vent opening or openings 102 of this anti-syphon member, it will remain within the lower main case 82 since the air vent communication from the anti-syphon member for anti-syphoning purposes to be hereinafter described is upwardly into the upper main case 84.

To complete the normal operation of the ball cock construction, the water supply within the flush tank 20 is ultimately replenished to its normal water level as shown in FIGS. 1 and 3. This moves the float 38 upwardly again pivoting the valve operating lever 92 to move the pilot valve pin 68 downwardly and reclose the valve assembly 30 to its closed position as previously described. Closing of the valve assembly 30, of course, closes the upper end of the water inlet tube 26 stopping the further flow of water into the flush tank 20.

Figure 5:
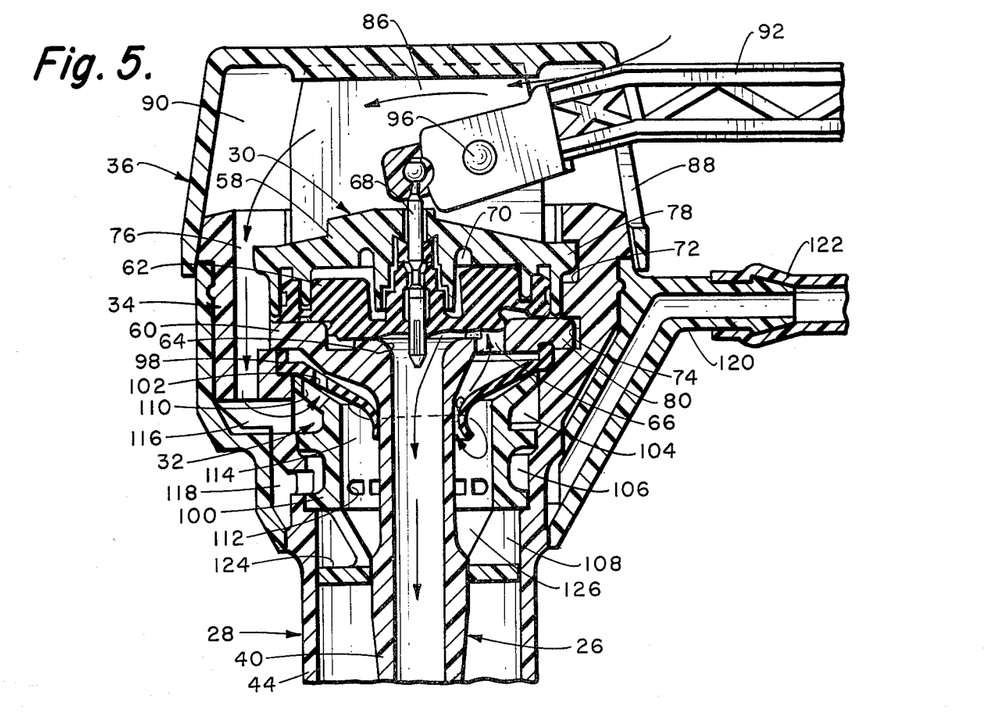
FIG. 5 is a view similar to FIG. 4, but showing the ball cock in a valve closed condition similar to FIG. 3 except under abnormal circumstances wherein anti-syphoning functioning is taking place under an attempted syphoning condition.

Relative to the positive safety feature of the anti-syphon assembly 32, the danger of syphoning water from the flush tank 20 reversely upwardly through the water outlet tube 28 and downwardly into the water inlet tube 26 so as to ultimately reach the water inlet supply would be presented when the pressure of the water inlet supply decreases sufficiently that a reverse vacuum flow condition is created within the water inlet tube 26. In this situation, as illustrated in FIG. 5, and assuming the worse condition of leakage paths being established for reverse flow through the various valve and anti-syphon elements, a positive air flow or venting from the air surrounding the upper portion of the ball cock construction above the water level in the flush tank 20 would take place and prevent any such water syphoning from the flush tank. As shown by the directional arrows in FIG. 5, air will be drawn into the void 90 of the upper main case 84 through the lever slot 88, downwardly through the slots 76 of the retainer 34, through the outlet directing insert 100 and the anti-syphon member 98, through the valve seat 60 and downwardly into the water inlet tube 26. More important to the principles of the present invention, it will be noted that the air supply for this air venting which positively prevents syphoning is drawn from the air in the flush tank 20 well above the highest possible water level therein since it is initially drawn in through the lever slot 88 of the upper main case 84 and the upward approximate spacing thereof above the water level can be clearly seen in both FIGS. 1 and 3.

According to certain other important principles of the present invention, it is pointed out that the particular formation and cooperation between the valve assembly 30 and the retainer 34 is such that not only these elements, but also the anti-syphon member 98 and the outlet directing insert 100, may be easily and conveniently originally assembled as well as later disassembled for various required maintenance operations. In original assembly, the outlet directing insert 100 is first positioned downwardly in the retainer 34, the anti-syphon member 98 thereover and the valve seat 60 over the anti-syphon member, the inlet tube upper part 40 also being inserted with the valve seat if formed as an integral part thereof. The valve seat 60 is locked with the retainer 34 by manipulating the bayonet joint there between as previously described, the valve seal 62 is positioned thereover and the valve cover 58 is inserted and locked with the retainer 34 by the other bayonet joint manipulation as previously described, thereby completing the assembly. Disassembly is, of course, just the reverse procedure and permits quick and convenient disassembly of these various elements for periodic debris and sediment cleaning operations, as well as possible replacement of any deteriorated parts such as the valve seal 62 or the anti-syphon member 98.

Figure 10:
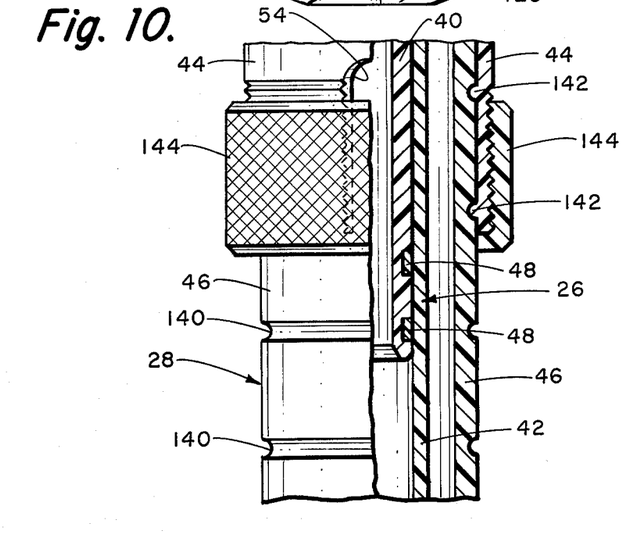
FIG. 10 is a fragmentary, side elevational view, part broken away and in vertical section, illustrating another preferred embodiment of outlet and inlet tube assembly for use with a ball cock similar to the ball cock of FIG. 1.

Another embodiment of the ball cock construction of the present invention is partially illustrated in FIG. 10 and the change therein from the first embodiment just described relates only to the vertical adjustment feature for the water inlet and outlet tubes 26 and 28, this second embodiment otherwise being identical to the first embodiment. As shown in FIG. 10, the inlet tube upper and lower parts 40 and 42 are vertically slidably end telescoped in the same manner as before. However, the outlet tube lower part 46 has a series of vertically or axially spaced recesses in the form of vertically spaced annular grooves 140 along the outer surface thereof. The lower extremity of the outlet tube upper part 44 is formed with vertically or axially spaced, radially inward projections in the form of spaced annular projections 142 on the inner surface thereof, the spacing of these projections being identical to the spacing of the annular grooves 140 on the outlet tube lower part 46 and the number of such projections only being two.

Also at the lower extremity of the outlet tube upper part 44, the vertically or axially extending and downwardly opening, circumferentially spaced slots 54 are again provided. Furthermore, a threaded lock collar 144 is threadably received over the lower extremity of the outlet tube upper part 44 completing the structure.

Thus, with the lock collar 144 positioned in place over the lower extremity of the outlet tube upper part 44 as shown in FIG. 10, this lock collar retains the outlet tube upper part inwardly against the outlet tube lower part 46 so as to retain the annular projections 142 extending into any given set of annular grooves 140. This will, of course, maintain a determined vertical adjustment of the water inlet and outlet tubes 26 and 28 so as to maintain a determined overall vertical height for the particular ball cock construction. Removal of the lock collar 144 from the outlet tube upper part 44, however, will permit outward flexing of the outlet tube upper part so as to disengage the annular projections 142 from the annular grooves 140 and permit a desired vertical adjustment or even complete disassembly of the various tube upper and lower parts.

According to the present invention, therefore, a unique ball cock construction is presented particularly useful for controlling the level of liquids such as water in tanks wherein selective vertical adjustment thereof permits the same to be adapted to virtually any usual configuration of tank and despite the liquid or water level therein within reasonable limits. At the same time, the ball cock construction is preferably formed of maximum compactness with a minimum of exposed movable parts while still being operable in a highly efficient manner serving its intended function. Still further, the ball cock construction may include an anti-syphon structure therein which has improved air venting in the event such structure is required to perform its safety anti-syphon function, all as hereinbefore described. Finally, the ball cock construction may also include particularly formed parts which contribute to convenience of original assembly and later disassembly for performing necessary maintenance operations.

I claim:

1. In a ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured to said valve, and a water outlet opening communicating into said tank at a lower extremity of said outlet tube; the improvements comprising: each of said inlet and outlet tubes having vertically end telescoping upper and lower parts with said inlet parts vertically communicating and said outlet parts vertically communicating during varying amounts of said vertical end telescoping; generally radially extending and rigidly interengaged adjustment means between said upper and lower parts of said outlet tube normally positively preventing by rigid interengagement at least straight vertical movement between said inlet and outlet tube upper and lower parts but being selectively operable for increasing and decreasing said outlet tube upper and lower part end telescoping carrying said inlet tube parts therewith to selectively vary the overall vertical height of said ball cock, said adjustment means including selectively operable release means for permitting radial disengagement of said rigidly interengaged adjustment means at any adjusted vertical height of said ball cock upon operation thereof and complete straight selective vertical separation between said inlet and outlet tube upper and lower parts, said adjustment means further including a spiral groove formed on one of said outlet tube upper and lower parts and a radial projection formed on the other of said outlet tube upper and lower parts, said radial projection normally extending rigidly into said spiral groove with relative rotation between said outlet tube upper and lower parts carrying said inlet tube parts therewith causing increasing and decreasing of said tube upper and lower part end telescoping, said spiral groove terminating spaced from its outlet tube part telescoping end termination normally preventing complete vertical separation of said outlet tube upper and lower parts during said engagement of said spiral groove by said radial projection, said release means being selectively operable for permitting radial disengagement between said spiral groove and radial projection upon operation thereof and said tube part straight selective vertical separation.

2. In a ball cock for controlling the level of liquids such as water in a tank, the ball cock being of the type having a vertical inlet tube securable to a tank bottom wall in communication with a water supply, a vertical outlet tube, a float controlled valve between upper extremities of said inlet and outlet tubes, and a water outlet opening communicating into said tank at a lower extremity of said outlet tube; the improvement comprising: a main case horizontally surrounding said valve and extending spaced vertically above and covering said valve forming a void above said valve and within said case; said valve having a valve outlet communicating downwardly into said outlet tube; anti-syphon means between said valve outlet and said outlet tube normally passing water between said valve outlet and said outlet tube but operable to permit drawing of air from outwardly of said outlet tube upon a reverse flow force being created at said valve outlet; an anti-syphon air vent operably connected to said anti-syphon means extending upwardly within said main case adjacent said valve and communicating upwardly within said main case with said void; a vent opening formed through said main case communicating with said void and outwardly with air surrounding said main case.

3. In a ball cock as defined in claim 2 in which said anti-syphon means includes a conically shaped resilient anti-syphon member; and in which said anti-syphon air vent includes an annular channel generally surrounding said anti-syphon member connected to a generally vertical channel extending upwardly within said main case adjacent said valve and opening upwardly into said main case void.

4. In a ball cock as defined in claim 2 in which a retainer is positioned surrounding said valve and at least partially surrounding said anti-syphon means; and in which said anti-syphon air vent extends upwardly through said retainer and opens into said main case void.

5. In a ball cock for controlling the level of liquids such as water in a tank, the ball cock being of the type having a vertical inlet tube securable to a tank bottom wall in communication with a water supply, a vertical outlet tube, a float controlled valve between upper extremities of said inlet and outlet tubes, and a water outlet opening communicating into said tank at a lower extremity of said outlet tube; the improvements comprising: said valve having an upper valve cover and a lower valve seat member operably assembled with a resilient valve seal therebetween operably movable upwardly away from and downwardly against said valve seat member; said valve seat member having a generally central inlet communicating downwardly with said inlet tube upper extremity and an outlet spaced transversely of said inlet communicating downwardly with said outlet tube upper extremity; a retainer generally horizontally surrounding said valve seat member; selectively releasable bayonet joint means between said valve seat member and said retainer for operably removably assembling said valve seat member with said inlet communicating downwardly with said inlet tube upper extremity and said outlet communicating downwardly with said outlet tube upper extremity; said bayonet joint means between said valve seat member and said retainer is a first bayonet joint means; and in which a selectively releasable second bayonet joint means is positioned above said first bayonet joint means between said valve cover and said retainer for operably removably assembling said valve cover over said valve seat member with said resilient valve seal therebetween.

6. In a ball cock as defined in claim 5 in which at least an upper portion of said inlet tube is secured to said valve seat member in communication with said valve seat member inlet; in which said bayonet joint means is a first bayonet joint means between said valve seat member and said retainer operably removably assembling both said valve seat member and said inlet tube upper portion with said retainer.

7. In a method of forming a vertically adjustable ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured to said valve, and a water outlet opening communicating into said tank at a lower extremity of said outlet tube; the steps of: forming and positioning each of said inlet and outlet tubes having vertically end telescoping upper and lower parts with said inlet parts vertically communicating and said outlet parts vertically communicating during varying amounts of said vertical end telescoping; during said forming and positioning, rigidly generally radially interengaging said upper and lower parts of said outlet tube normally positively resisting at least straight vertical movement between said inlet and outlet tube upper and lower parts; during said formation of said radial interengagement of said outlet tube upper and lower parts, forming said radial interengagement selectively operable for increasing and decreasing said outlet tube upper and lower part end telescoping by forming a spiral groove on one of said outlet tube upper and lower parts radially engaged by a rigid radial projection formed on the other of said outlet tube upper and lower parts thereby permitting increasing and decreasing of said outlet tube upper and lower part end telescoping by selective relative rotation between said outlet tube upper and lower parts carrying said inlet tube parts therewith with resultant final selected positioning always normally positively resisting said at least straight vertical movement to permit selective varying of the overall vertical height of said ball cock; terminating said spiral groove spaced from its tube part telescoping end termination normally preventing vertical separation of said outlet tube upper and lower parts during said relative rotation between said tube upper and lower parts by retaining said engagement of said radial projection with said spiral groove; during said forming of said groove and projection radial interengagement selectively operable, forming said groove and projection radial interengagement selectively operable at any adjusted vertical height of said ball cock for permitting selective complete radial separation of said groove and projection radial interengagement to permit complete vertical separation between said inlet and outlet tube upper parts and said inlet and outlet tube lower parts.

8. In a ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured˙ to said valve, and a water outlet opening communicating into said tank at a lower extremity of said outlet tube; the improvements comprising: each of said inlet and outlet tubes having vertically end telescoping upper and lower parts with said inlet parts vertically communicating and said outlet parts vertically communicating during varying amounts of said vertical end telescoping; generally radially extending and rigidly interengaged adjustment means between said upper and lower parts of said outlet tube normally positively preventing by rigid interengagement at least straight vertical movement between said inlet and outlet tube upper and lower parts but being selectively operable for increasing and decreasing said outlet tube upper and lower part end telescoping carrying said inlet tube parts therewith to selectively vary the overall vertical height of said ball cock, said adjustment means including selectively operable release means for permitting radial disengagement of said rigidly interengaged adjustment means at any adjusted vertical height of said ball cock upon operation thereof and complete straight selective vertical separation between said inlet and outlet tube upper and lower parts, said adjustment means further including a spiral groove formed on one of said outlet tube upper and lower parts and a radial projection formed on the other of said outlet tube upper and lower parts, said radial projection normally extending rigidly into said spiral groove with relative rotation between said outlet tube upper and lower parts carrying said inlet tube parts therewith causing increasing and decreasing of said tube upper and lower part end telescoping, said spiral groove terminating spaced from its outlet tube part telescoping end termination normally preventing complete vertical separation of said outlet tube upper and lower parts during said engagement of said spiral groove by said radial projection, said release means further including an outer of said outlet tube upper and lower parts having circumferentially spaced and generally vertically extending slots formed in said part telescoped end and opening vertically of said end and a lock collar surrounding said outer part end and maintaining said radial projection rigidly engaged in said spiral groove, vertical displacement of said lock collar from said outer part end permitting radial outward disengagement between said radial projection and said spiral groove by virtue of said slots to permit complete vertical separation between said inlet and outlet tube upper and lower parts.

9. In a ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured to said valve, and a water outlet opening communicating into said tank at a lower extremity of said outlet tube; the improvements comprising: each of said inlet and outlet tubes having vertically end telescoping upper and lower parts with said inlet parts vertically communicating and said outlet parts vertically communicating during varying amounts of said vertical end telescoping; generally radially extending and rigidly interengaged adjustment means between said upper and lower parts of said outlet tube normally positively preventing by rigid interengagement at least straight vertical movement between said inlet and outlet tube upper and lower parts but being selectively operable for increasing and decreasing said outlet tube upper and lower part end telescoping carrying said inlet tube parts therewith to selectively vary the overall vertical height of said ball cock, said adjustment means including selectively operable release means for permitting radial disengagement of said rigidly interengaged adjustment means at any adjusted vertical height of said ball cock upon operation thereof and complete straight selective vertical separation between said inlet and outlet tube upper and lower parts, said adjustment means further including groove means extending at various vertical heights on one of said outlet tube upper and lower parts and projection means on the other of said outlet tube upper and lower parts, said groove means and projection means normally being rigidly radially interengaged at said groove means various vertical heights resisting said at least straight vertical movement between said inlet and outlet tube upper and lower parts, said release means further including certain of said outlet tube upper and lower parts having slot means selectively operable for permitting selective radial release of said groove means and projection means from said interengagement to permit relative vertical movement between said inlet and outlet tube upper and lower parts.

10. In a method of forming a vertically adjustable ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured to said valve, and a water outlet opening communicating into said tank at a lower extremity of said outlet tube; the steps of: forming and positioning each of said inlet and outlet tubes having vertically end telescoping upper and lower parts with said inlet parts vertically communicating and said outlet parts vertically communicating during varying amounts of said vertical end telescoping; during said forming and positioning, rigidly generally radially interengaging said upper and lower parts of said outlet tube normally positively resisting at least straight vertical movement between said inlet and outlet tube upper and lower parts by forming groove means extending at various vertical heights on one of said outlet tube upper and lower parts and rigid projection means on the other of said outlet tube upper and lower parts and then normally positioning said projection means extending radially into said groove means at one vertical height to normally provide radial interengagement between said outlet tube upper and lower parts which resists said at least straight vertical movement between said inlet and outlet tube upper and lower parts during said formation of said radial interengagement of said outlet tube upper and lower parts, forming said radial interengagement selectively operable for increasing and decreasing said outlet tube upper and lower part end telescoping by forming slot means on an outer of said outlet tube upper and lower parts selectively operable for permitting selective radial disengagement between said groove means and projection means at said one vertical height and interengagement between said groove means and projection means at another vertical height again resisting said at least straight vertical movement between said inlet and outlet tube upper and lower parts for selectively increasing and decreasing said outlet tube upper and lower part end telescoping carrying said inlet tube parts therewith with resultant final selected positioning always normally positively resisting said at least straight vertical movement to permit selective varying of the overall vertical height of said ball cock during said forming of said radial interengagement selectively operable, forming said radial interengagement selectively operable at any adjusted vertical height of said ball cock for permitting selective complete radial separation of said radial interengagement and to permit complete vertical separation between said inlet and outlet tube upper parts and said inlet and outlet tube lower parts from any adjusted vertical height.

11. In a method of forming a vertically adjustable ball cock as defined in claim 10 in which said step of forming said radial interengagement selectively operable for increasing and decreasing said tube upper and lower part end telescoping includes forming said slot means including generally vertically extending and vertically opening slots on an outer of said outlet tube upper and lower parts at said part telescoping ends normally circumscribed by a selectively vertically displaceable lock collar normally retaining said projection means extending into said groove means so that vertical displacement of said lock collar permits by virtue of said slots radial separation of said projection means from said groove means at said one vertical height and interengagement between said projection means and groove means at another vertical height with repositioning of said lock collar thereby again resisting said at least straight vertical movement between said inlet and outlet tube upper and lower parts for selectively increasing and decreasing said tube upper and lower part end telescoping including said tube upper and lower part complete separation from any adjusted vertical height.

12. In a ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured to said valve, and a water outlet opening communicating into said tank at a lower extremity of said outlet tube; the improvements comprising: each of said inlet and outlet tubes having vertically end telescoping upper and lower parts with said inlet parts vertically communicating and said outlet parts vertically communicating during varying amounts of said vertical end telescoping; generally radially extending and rigidly interengaged adjustment means between said upper and lower parts of said outlet tube normally positively preventing by rigid interengagement at least straight vertical movement between said inlet and outlet tube upper and lower parts but being selectively operable for increasing and decreasing said outlet tube upper and lower part end telescoping carrying said inlet tube parts therewith to selectively vary the overall vertical height of said ball cock, said adjustment means including selectively operable release means for permitting radial disengagement of said rigidly interengaged adjustment means at any adjusted vertical height of said ball cock upon operation thereof and complete straight selective vertical separation between said inlet and outlet tube upper and lower parts, said adjustment means further including a spiral groove formed on one of said outlet tube upper and lower parts and a radial projection formed on the other of said outlet tube upper and lower parts, said radial projection normally extending rigidly into said spiral groove with relative rotation between said outlet tube upper and lower parts carrying said inlet tube parts therewith causing increasing and decreasing of said tube upper and lower part end telescoping, said release means further including certain of said outlet tube upper and lower parts having slot means selectively operable for permitting selective radial release of said spiral groove and projection from said interengagement to permit straight relative vertical movement between said inlet and outlet tube upper and lower parts including complete separation thereof.

13. In a ball cock as defined in claim 12 in which said spiral groove terminates spaced from its outlet tube part telescoping end termination normally preventing complete vertical separation of said outlet tube upper and lower parts by rotation therebetween during said engagement of said spiral groove by said radial projection.

14. In a ball cock as defined in claim 12 in which said slot means of said release means includes an outer of said outlet tube upper and lower parts having circumferentially spaced and generally vertically extending slots formed in said part telescoped end and opening vertically of said end and said release means further includes a lock collar normally surrounding and selectively vertically displaceable of said outer part end and maintaining said radial projection rigidly engaged in said spiral groove, vertical displacement of said lock collar from said outer part end permitting radial outward disengagement between said radial projection and said spiral groove by virtue of said slots to permit complete vertical separation between said inlet and outlet tube upper and lower parts.

15. In a ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured to said valve, and a water outlet opening communicating into said tank at a lower extremity of said outlet tube; the improvements comprising: each of said inlet and outlet tubes having vertically end telescoping upper and lower parts with said inlet parts vertically communicating and said outlet parts vertically communicating during varying amounts of said vertical end telescoping; generally radially extending and rigidly interengaged adjustment means between said upper and lower parts of said outlet tube normally positively preventing by rigid interengagement at least straight vertical movement between said inlet and outlet tube upper and lower parts but being selectively operable for increasing and decreasing said outlet tube upper and lower part end telescoping carrying said inlet tube parts therewith to selectively vary the overall vertical height of said ball cock, said adjustment means including selectively operable release means for permitting radial disengagement of said rigidly interengaged adjustment means at any adjusted vertical height of said ball cock upon operation thereof and complete straight selective vertical separation between said inlet and outlet tube upper and lower parts, said adjustment means further including groove means extending at various vertical heights on one of said outlet tube upper and lower parts and projection means on the other of said outlet tube upper and lower parts, said groove means and projection means normally being rigidly radially interengaged at said groove means various vertical heights resisting said at least straight vertical movement between said inlet and outlet tube upper and lower parts, said release means further including an outer of said outlet tube upper and lower parts having circumferentially spaced and generally vertically extending slots formed in said part telescoped end and opening vertically of said end and a selectively vertically displaceable lock collar normally surrounding said outer part end and maintaining said projection means rigidly engaged in said groove means, vertical displacement of said lock collar from said outer part end permitting radial outward disengagement between said projection means and said groove means by virtue of said slots to permit complete vertical separation between said inlet and outlet tube upper and lower parts.

16. In a method of forming a vertically adjustable ball cock for controlling the level of liquids such as water in a tank, the ball cock being of the type having a vertical inlet tube downwardly securable to a tank bottom wall in communication with a water supply and upwardly secured to a float controlled valve, a vertical outlet tube telescoping said inlet tube spaced radially outwardly therefrom for the flow of water downwardly therebetween, said outlet tube being downwardly securable to said tank bottom wall and upwardly secured to said valve, and a water outlet opening communicating into said tank at a lower extremity of said outlet tube; the steps of: forming and positioning each of said inlet and outlet tubes having vertically end telescoping upper and lower parts with said inlet parts vertically communicating and said outlet parts vertically communicating during varying amounts of said vertical end telescoping; during said forming and positioning, rigidly generally radially interengaging said upper and lower parts of said outlet tube normally positively resisting at least straight vertical movement between said inlet and outlet tube upper and lower parts; during said formation of said radial interengagement of said outlet tube upper and lower parts, forming said radial interengagement selectively operable for increasing and decreasing said outlet tube upper and lower part end telescoping by forming a spiral groove on one of said outlet tube upper and lower parts radially engaged by a rigid radial projection formed on the other of said outlet tube upper and lower parts thereby permitting increasing and decreasing of said outlet tube upper and lower part end telescoping by selective relative rotation between said outlet tube upper and lower parts carrying said inlet tube parts therewith with resultant final selected positioning always normally positively resisting said at least straight vertical movement to permit selective varying of the overall vertical height of said ball cock; during said forming of said groove and projection radial interengagement selectively operable, forming said radial interengagement selectively operable at any adjusted vertical height of said ball cock by forming slot means on an outer of said outlet tube upper and lower parts selectively operable at said any adjusted vertical height of said ball cock for permitting selective complete radial separation of said groove and projection radial interengagement to permit complete vertical separation between said inlet and outlet tube upper parts and said inlet and outlet tube lower parts at said any adjusted vertical height of said ball cock.

17. In a method of forming a vertically adjustable ball cock as defined in claim 16 in which said steps of rigidly generally radially interengaging said upper and lower parts of said outlet tube and said forming of said radial interengagement selectively operable include terminating said spiral groove spaced from its tube part telescoping end termination normally preventing vertical separation of said outlet tube upper and lower parts during said relative rotation between said tube upper and lower parts by retaining said engagement of said radial projection with said spiral groove.

* * * * *